United States Patent
Albouyeh et al.

(10) Patent No.: US 9,930,168 B2
(45) Date of Patent: Mar. 27, 2018

(54) SYSTEM AND METHOD FOR CONTEXT AWARE PROPER NAME SPELLING

(71) Applicant: International Business Machines Corporation, Armonk, NY (US)

(72) Inventors: Shadi E. Albouyeh, Raleigh, NC (US); James E. Fox, Apex, NC (US); Trudy L. Hewitt, Cary, NC (US); Prasad L. Imandi, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 14/967,495

(22) Filed: Dec. 14, 2015

(65) Prior Publication Data
US 2017/0171377 A1  Jun. 15, 2017

(51) Int. Cl.
*H04M 1/725* (2006.01)
*H04L 12/58* (2006.01)
*H04W 4/12* (2009.01)
*H04W 8/18* (2009.01)

(52) U.S. Cl.
CPC ........ *H04M 1/72552* (2013.01); *H04L 51/32* (2013.01); *H04W 4/12* (2013.01); *H04W 8/183* (2013.01)

(58) Field of Classification Search
CPC ... H04M 1/72552; H04L 51/32; H04W 8/183; H04W 4/12
See application file for complete search history.

(56) References Cited

U.S. PATENT DOCUMENTS

| | | | |
|---|---|---|---|
| 2004/0002850 A1 | 1/2004 | Shaefer, Jr. et al. | |
| 2004/0093567 A1* | 5/2004 | Schabes | G06F 17/273 715/257 |
| 2008/0046405 A1* | 2/2008 | Olds | G06F 17/3064 |
| 2010/0014887 A1 | 1/2010 | Conway et al. | |
| 2010/0100371 A1* | 4/2010 | Yuezhong | G06F 17/2881 704/9 |
| 2010/0119053 A1* | 5/2010 | Goeldi | G06Q 10/00 379/265.09 |
| 2013/0211824 A1 | 8/2013 | Tseng et al. | |
| 2014/0035823 A1 | 2/2014 | Khoe et al. | |

(Continued)

OTHER PUBLICATIONS

Al-Mubaid et al., "Chapter 11: Learning to find context based spelling errors," Data Mining and Knowledge Discovery Based on Rule Induction, 2004, pp. 1-31.

(Continued)

*Primary Examiner* — Joseph Dean, Jr.
(74) *Attorney, Agent, or Firm* — Cantor Colburn David Zwick (57) ABSTRACT

According to some embodiments, a method for determining proper name spelling in a text message from a sender to a receiver is described. The method may include evaluating text from a sender to a receiver to identify a proper name, comparing the text against a repository containing one or more proper names, determining a confidence ranking related to the accuracy of spelling of the proper name using shared contacts between the sender and receiver, and outputting a specific spelling of the proper name based on a highest confidence ranking of the confidence ranking.

13 Claims, 5 Drawing Sheets

(56) References Cited

U.S. PATENT DOCUMENTS

2014/0358544 A1 12/2014 Printz
2015/0170650 A1 6/2015 Bonforte

OTHER PUBLICATIONS

Apple Support Communities, "How can I get Siri to spell my nama right?," [online]; [retrieved on Dec. 9, 2015]; retrieved from the Internet http://www.discussions.apple.com/thread/3567525, pp. 1-2.

Namenerds, "Irish Names from Ancient to Modern," [online]; [retrieved on Nov. 19, 2015]; retrieved from the Internet http://www.namenerds.com/irish/Katelyn.html, pp. 1-2.

C. Phua, "The Personal Name Problem and a Recommended Data Mining Solution," Encyclopedia of Data Warehousing and Mining, 2009, pp. 1-8.

* cited by examiner

| Caitlin | Catelin | Caytlin | Caytelin | Catlin | Caetlin | Caitelin | Cayetlin | Kayetlin |
| Caitlan | Catelan | Caytlan | Caytelan | Catlan | Caetlan | Caitelan | Cayetlan | Kayetlan |
| Caitlyn | Catelyn | Caytlyn | Caytelyn | Catlyn | Caetlyn | Caitelyn | Cayetlyn | Kayetlyn |
| Caitlynn | Catelynn | Caytlynn | Caytelynn | Catlynn | Caetlynn | Caitelynn | Cayetlynn | Kayetlynn |
| Caitlynne | Catelynne | Caytlynne | Caytelynne | Catlynne | Caetlynne | Caitelynne | Cayetlynne | Kayetlynne |
| Caitlind | Catelind | Caytlind | Caytelind | Catlind | Caetlind | Caitelind | Cayetlind | Kayetlind |
| Caitland | Cateland | Caytland | Cayteland | Catland | Caetland | Caiteland | Cayetland | Kayetland |
| Caitlinn | Catelinn | Caytlinn | Caytelinn | Catlinn | Caetlinn | Caitelinn | Cayetlinn | Kayetlinn |
| Caitlinne | Catelinne | Caytlinne | Caytelinne | Catlinne | Caetlinne | Caitelinne | Cayetlinne | Kayetlinne |
| Kaitlin | Katelin | Kaytlin | Kaytelin | Katlin | Kaetlin | Keightlin | Kayetlin | Kaitelin |
| Kaitlan | Katelan | Kaytlan | Kaytelan | Katlan | Kaetlan | Keightlan | Kayetlan | Kaitelan |
| Kaitlyn | Katelyn | Kaytlyn | Kaytelyn | Katlyn | Kaetlyn | Keightlyn | Kayetlyn | Kaitelyn |
| Kaitlynn | Katelynn | Kaytlynn | Kaytelynn | Katlynn | Kaetlynn | Keightlynn | Kayetlynn | Kaitelynn |
| Kaitlynne | Katelynne | Kaytlynne | Kaytelynne | Katlynne | Kaetlynne | Keightlynne | Kayetlynne | Kaitelynne |
| Kaitlind | Katelind | Kaytlind | Kaytelind | Katlind | Kaetlind | Keightlind | Kayetlind | Kaitelind |
| Kaitland | Kateland | Kaytland | Kayteland | Katland | Kaetland | Keightland | Kayetland | Kaiteland |
| Kaitlinn | Katelinn | Kaytlinn | Kaytelinn | Katlinn | Kaetlinn | Keightlinn | Kayetlinn | Kaitelinn |
| Kaitlinne | Katelinne | Kaytlinne | Kaytelinne | Katlinne | Kaetlinne | Keightlinne | Kayetlinne | Kaitelinne |

FIG. 5

SYSTEM AND METHOD FOR CONTEXT AWARE PROPER NAME SPELLING

BACKGROUND

The present disclosure relates to a system and method for context aware proper name spelling, and more specifically, to a system and method for determining the probability and confidence ranking for spelling proper names based on evaluation of shared social networks and/or contacts of a sender and receiver(s).

People spend a lot of their time entering text into computing devices, whether typing e-mails, submitting search queries, filling out electronic forms, or otherwise. Certain techniques have been developed to assist in such text entry in certain situations. For example, systems can make educated guesses after a user has typed several characters, to suggest possible auto-complete text entries so that the user need not type every character in a lengthy entry. Also, mobile devices often have constrained keyboards so that multiple characters are represented by each key—after a user has pressed several keys, a system can make inferences regarding which letter on each key the user intended to type. In this manner, such a system can select an appropriate word or group of words from key presses that could otherwise be ambiguous.

Even existing systems that enable users to message others hands-free do not have a way at present to select the correct spelling with regards to the person's shared contacts or other context aware measures to ensure correctness between the individuals in communication.

It may be advantageous to provide context aware proper name spelling and management of recommendations for proper name spellings encountered by mobile device users.

SUMMARY

According to some embodiments, a method for determining proper name spelling in a text message from a sender to a receiver is described. The method may include evaluating text from a sender to a receiver to identify a proper name, comparing the text against a repository containing one or more proper names, determining a confidence ranking related to the accuracy of spelling of the proper name using shared contacts between the sender and receiver, and outputting a specific spelling of the proper name based on a highest confidence ranking of the confidence ranking.

According to other embodiments, an information processing system for selecting features from a feature space is described. The information processing system includes a memory, a processing device communicatively coupled to the memory, and a name selection module communicatively coupled to the memory and the processing device. The name selection module is configured to perform the steps of a method which may include evaluating text from a sender to a receiver to identify a proper name, comparing the text against a repository containing one or more proper names, determining a confidence ranking related to an accuracy of spelling of the proper name using shared contacts between the sender and receiver, and outputting a specific spelling of the proper name based on a highest confidence ranking of the confidence ranking.

In yet other embodiments, a non-transitory computer-readable storage medium is described. The storage medium may store instructions executable to perform a method for determining proper name spelling in a text message from a sender to a receiver. The method may include evaluating text from a sender to a receiver to identify a proper name, comparing the text against a repository containing one or more proper names, determining a confidence ranking related to the accuracy of spelling of the proper name using shared contacts between the sender and receiver, and outputting a specific spelling of the proper name based on a highest confidence ranking of the confidence ranking.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
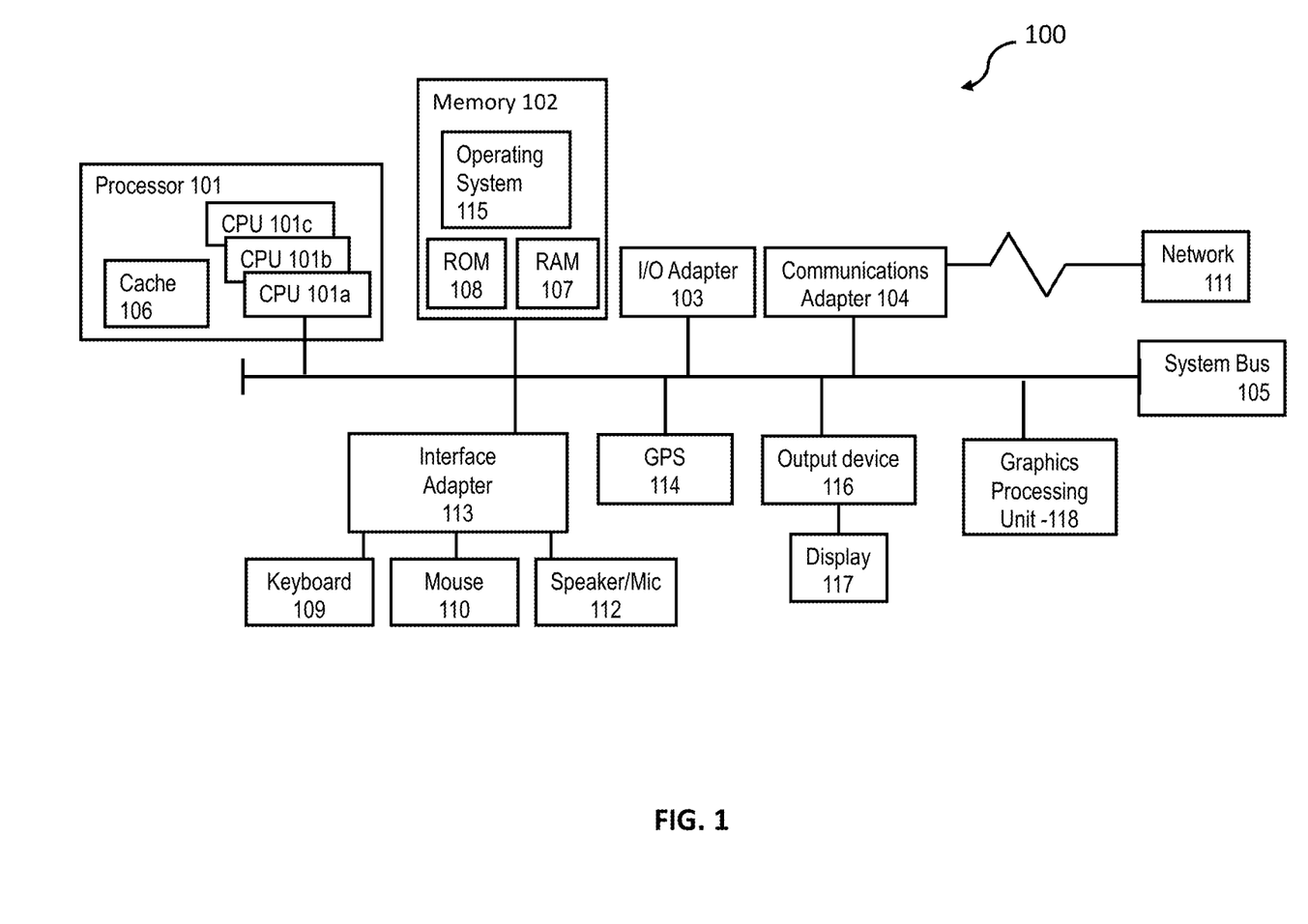
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices (e.g., external memory devices (not shown)). Communications adaptor 104 may be operatively connect computer 100 to one or more networks 111. System bus 105 may also connect one or more user interfaces via interface adaptor 113. Interface adaptor 113 may connect a plurality of user interfaces to computer 100 including, for example, a keyboard 109, a mouse 110, a speaker/microphone 112, etc. For example, the microphone 112 is connected to a dictation subsystem (not shown) that includes a voice capture module for entering text verbally instead of using the keyboard 109. System bus 105 may also connect a GPS receiver 114, output device 116 and display 117 to processor 101. Processor 101 may also be operatively connected to a graphics processing unit 118.

Processor 101 may be a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The memory cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 115. Operating system 115 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 113 may be configured to operatively connect one or more I/O devices to computer 100. For example, interface adaptor 113 may connect a conventional keyboard 109 and mouse 110. Other output devices, e.g., speaker 112, may be operatively connected to interface adaptor 113. Other output devices may also be included, although not shown. For example, devices may include but are not limited to a printer, a scanner, microphone, and/or the like. Finally, the I/O devices connectable to interface adaptor 113 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

I/O adaptor 103 may also operatively connect to and/or embody an antenna, keyboard, mouse, joystick, (infrared) remote control, camera, card reader, fax machine, dongle, biometric reader, microphone, touch screen, touchpad, trackball, sensor (e.g., accelerometer, light sensor, gyroscope, proximity sensor, or the like), stylus, scanner, storage device, transceiver, video device/source, visors, etc. I/O adaptor 103 may connect a printer, fax machine, video display (e.g., cathode ray tube (CRT), liquid crystal display (LCD), light-emitting diode (LED), plasma, or the like), audio speaker, etc. In some embodiments, I/O adaptor 103 may include a transceiver that may be disposed in connection with processor 101. The transceiver may facilitate various types of wireless transmission or reception. For example, the transceiver may include an antenna operatively connected to a transceiver chip (e.g., Texas Instruments WiLink, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.).

According to some embodiments, computer 100 may include a GPS 114 configured to provide positioning information to processor 101.

Computer 100 can further include output device 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer, mobile device, and/or the like, the instructions in memory 102 may further include a basic input output system (BIOS) (omitted for simplicity). The BIOS can be a set of essential routines that initialize and test hardware at startup, start operating system 115, and support the transfer of data among the operatively connected hardware devices. The BIOS can be stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
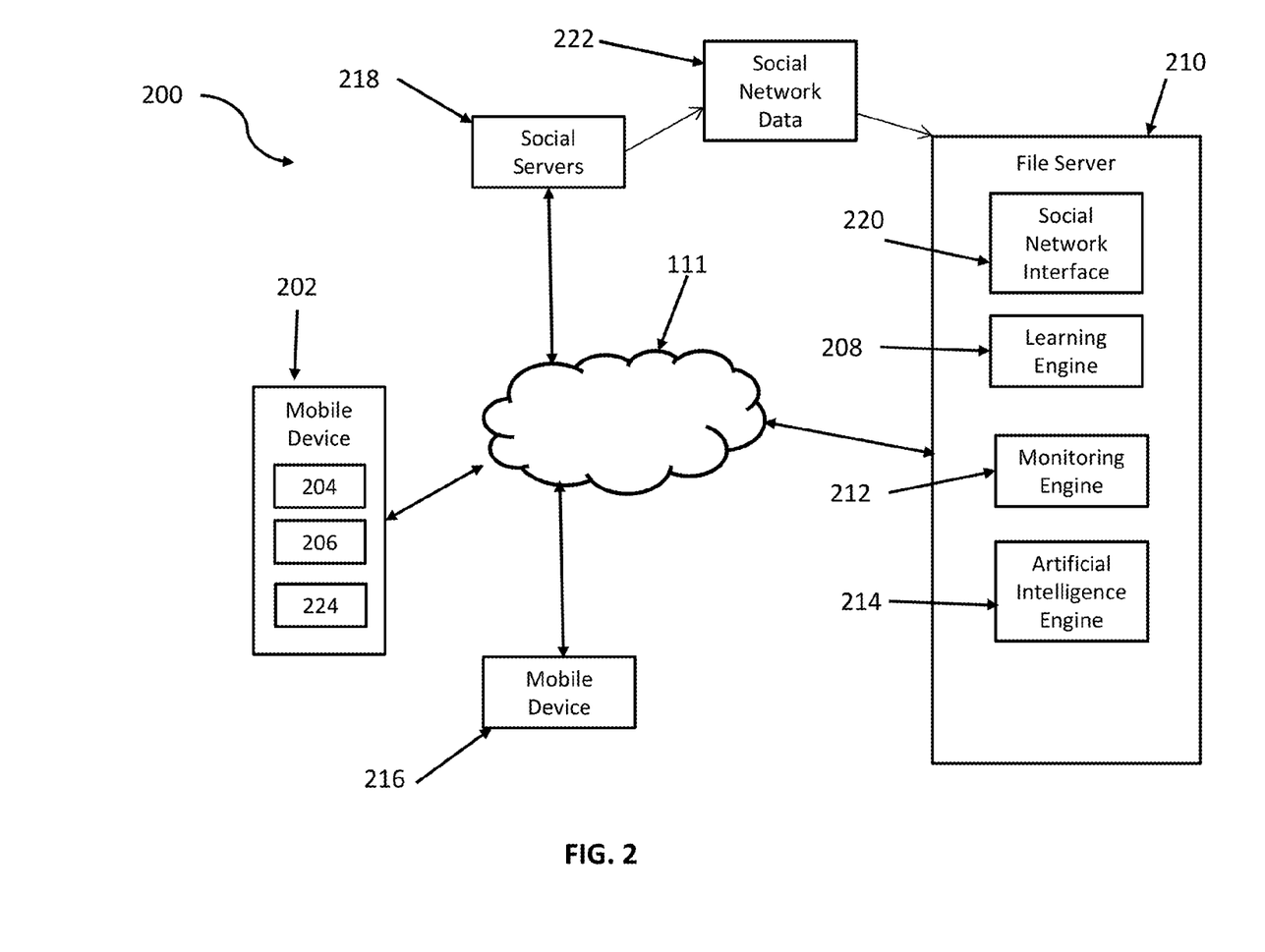
FIG. 2 depicts a computing environment for providing context aware proper name spelling and management of recommendations for mobile device applications on a mobile device in accordance with an exemplary embodiment.

Referring now to FIG. 2, a computing environment 200 for improving the accuracy in spelling of proper names including names of people, places, businesses, and/or the like, in accordance with an exemplary embodiment. Computing environment 200 may include at least one mobile device 202 operatively connected to at least one remote file server 210 through the network 111. Network 111 may be a mobile network, (e.g. GSM, FDMA, CDMA, etc.), the Internet, and/or any other suitable communication network. Computing environment 200 may also include a plurality of other mobile devices 216, which may also be in communication with remote file server 210.

Mobile device 202 may include a custom program saved within its memory comprising logic configured as a framework in which mobile device 202 may communicate with file server 210 via a middleware infrastructure (not depicted), an application server, (e.g., or remote file server 210 and/or social servers 218) or some other method. In some embodiments, the framework may include one or more programs for monitoring installation of a mobile application, collection of user application interface information, and transmission of the information to remote file server 210 and or social network servers 218. In some embodiments, the framework may be installed on mobile device 202 as a separate part of an installation of a mobile application.

According to some embodiments, the framework may include instruction means for collecting user application data. The user application data may include a plurality of data structures including, for example, a database of user contacts 204, but not limited thereto. Mobile device 202 may be configured to collect user application interaction data in the form of user contacts 204 and transmit the user contacts data to remote file server 210 and/or social network servers 218.

Computing environment 200 further includes software 206 that enables computer environment 200 to provide the features described herein. Software 206 comprises one or more software modules. A user of the mobile device 202 may interact with computer environment 200 as shown in FIG. 1 or, as shown in FIG. 2, the user may interact with computer environment 200 indirectly by using the communications adapter 104 and network 111 (See FIG. 1). Communication mobile device 202 can by any device capable of sending data to and receiving data from computer system 200. For example, device 202 may be a personal computer, mobile telephone, personal digital assistant (PDA), or other device capable of transmitting and receiving data.

When computer 100 executes software 206, computer 100 is operable to: (a) enable the user to input text including a proper name including names of persons, places and/or businesses into computer 100, (b) formulate reasonable spelling variations of the query proper name based on the evaluation of shared social networks/contacts of the user (i.e., sender) and receiver(s), and (c) output the reasonable highest confidence ranked spelling variation in the message for the sender.

Still referring to FIG. 2, remote file server 210 may include a learning engine 208, a monitoring engine 212, and an artificial intelligence engine 214, implemented by one or more processors (e.g., processor 101). Monitoring engine 212 may be configured to retrieve user application data including user contacts 204 from mobile device 202, inter-correlate the data, and update user contacts 204 with the inter-correlated data. In some embodiments, file server 210 may retrieve user application data from a plurality of mobile devices (e.g., mobile device 202 and 216, etc.) and social network servers 218.

In an exemplary embodiment, file server 210 may retrieve user application data as social network data 222 from one or more social servers 218 via a social network interface 220. In the figure, a social network interface 220 is shown and is programmed to make requests from a group of social servers 218 for information reflecting word usage. The request may follow a common API that may require that the social server 218 do nothing more than identify the user and identify itself. The social servers 218 may conduct processing like that discussed above, and may return data relating to the user's social network, such as data formatted to be added to a user's contacts 204, which data reflects usage by the user's social network. Presumably, use by friends and business associates is at least somewhat predictive of future word use by the user.

In this manner, system 200 may provide customized text entry assistance to a user. The customization may be directed to temporal information such as context of the text message including location of at least the sender and/or receiver, but it may also be aimed socially, so as to provide even more accurate disambiguation than would otherwise be possible.

Likewise, other servers connected to the network 111 may provide further data to user contacts 204. For example, a user may have an account on a server separate from the file server 210 or the social servers 218 that stores information, such as an e-mail account or an instant messaging account. The data from the separate server may be synchronized with the file server's 210 data using the social network interface 220. In some implementations, the user may add accounts on various servers to provide more data to the file server 210. In one example, the user may link a Yahoo!® e-mail account and a Gmail® e-mail account to the file server 210. Data may be provided from multiple sources, including servers and client devices. For example, a mobile device and a user account from a separate server may both provide data to user contacts 204 and or use data in the social network interface. Input from the user can be received in any form, including acoustic, speech or tactile input. Various embodiments contemplate systems and methods for performing automatic speech recognition (ASR) and natural language understanding (NLU) that enable high accuracy recognition and understanding of freely spoken utterances which may contain proper names and similar entities. The proper name entities may contain or be comprised wholly of words that are not present in the vocabularies of these systems as normally constituted. Recognition of the other words in the utterances in question—e.g., words that are not part of the proper name entities—may occur at regular, high recognition accuracy. Various embodiments provide as output not only accurately transcribed running text of the complete utterance, but also a symbolic representation of the meaning of the input, including appropriate symbolic representations of proper name entities, adequate to allow a computer system to respond appropriately to the spoken request without further analysis of the user's input.

In one embodiment, for example, but not limited thereto, a user may be using an intelligent personal assistant (e.g., Siri®) on his mobile device 202 to dictate a text message to send to his co-worker. In the message, the user asks his coworker to talk to their boss "Caitlin", however, the spelling typed into the text is represented as "Kaitlyn" on the display 117.

Figure 5:
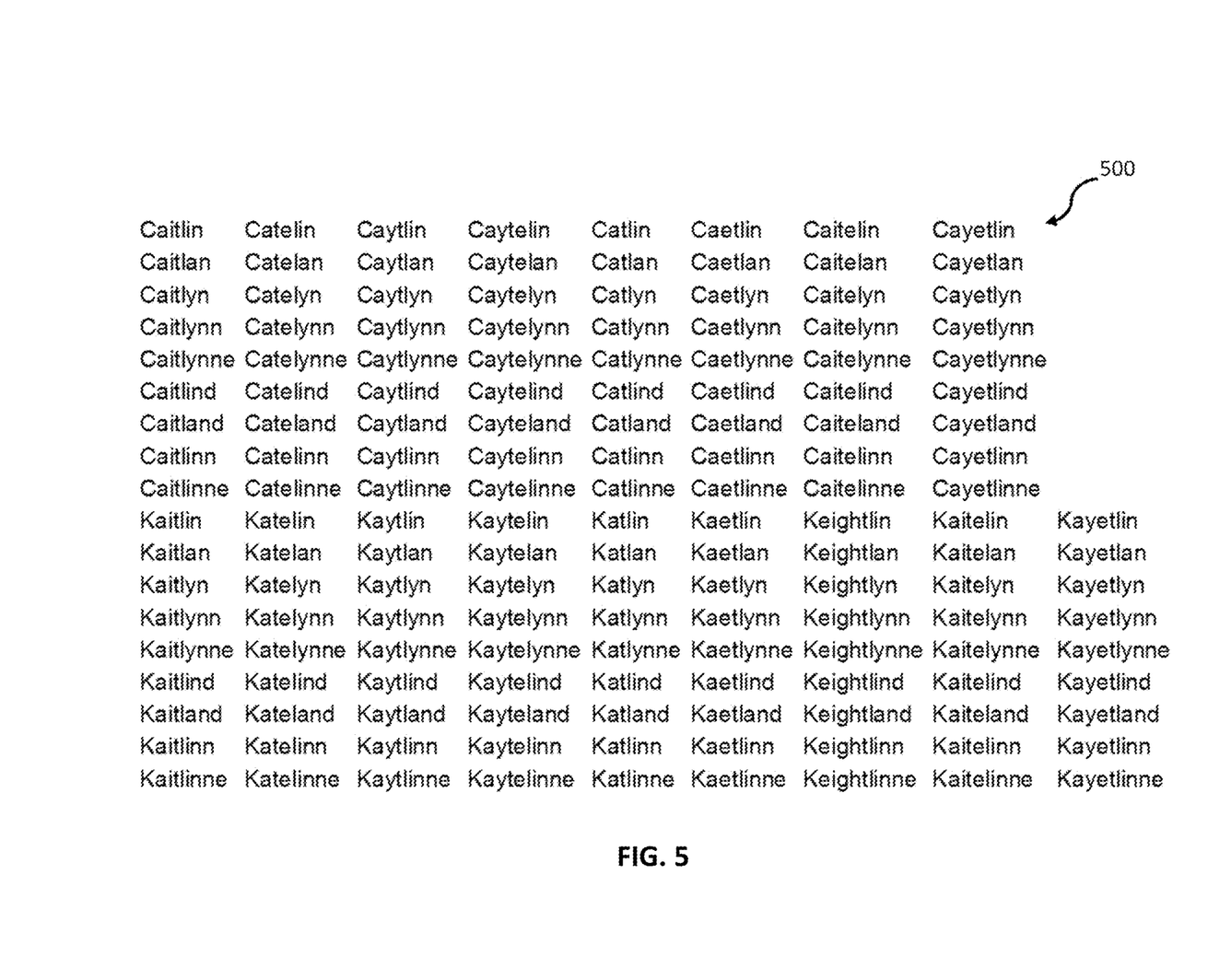
FIG. 5 depicts a table of plausible ways to spell the name "Katelyn" based on actual recorded spellings in accordance with an exemplary embodiment.

Referring to FIG. 5, a table 500 of possible various spellings of the phonetic word "Katelyn" is illustrated. That is, many proper names are homonyms—have many variations in spellings, but are pronounced the same way. For example, there are 155 plausible ways to spell the name "Katelyn," based on actual recorded spellings—(See http://www.namenerds.com/irish/Katelyn.html.)

There are many resources now available to help users message people hands free, such as Siri® and other text to type offerings; however, these services do not have a way at present to select the correct spelling with regards to the sender and receiver(s) shared contacts to ensure correctness of spelling of proper names between the sender and receiver(s) in communication.

The user as a sender of text desires that the personal assistant (e.g., Siri®) on the mobile device 202 was able to look at the shared contacts between his and his coworkers social network to determine the proper spelling of their boss' name without the improper spelling thereof repeatedly appearing on the display 117 when subsequently dictating the same name. That is, in instances when the proper name of a person, place or business, for example, but not limited thereto, is misspelled in the display 117, it is desired that manual correction of the same subsequent dictated name is not necessary due to the device being able to leverage shared contacts, social network and various other characteristics between the user as sender and the intended receiver(s) of the text message.

Figure 3:
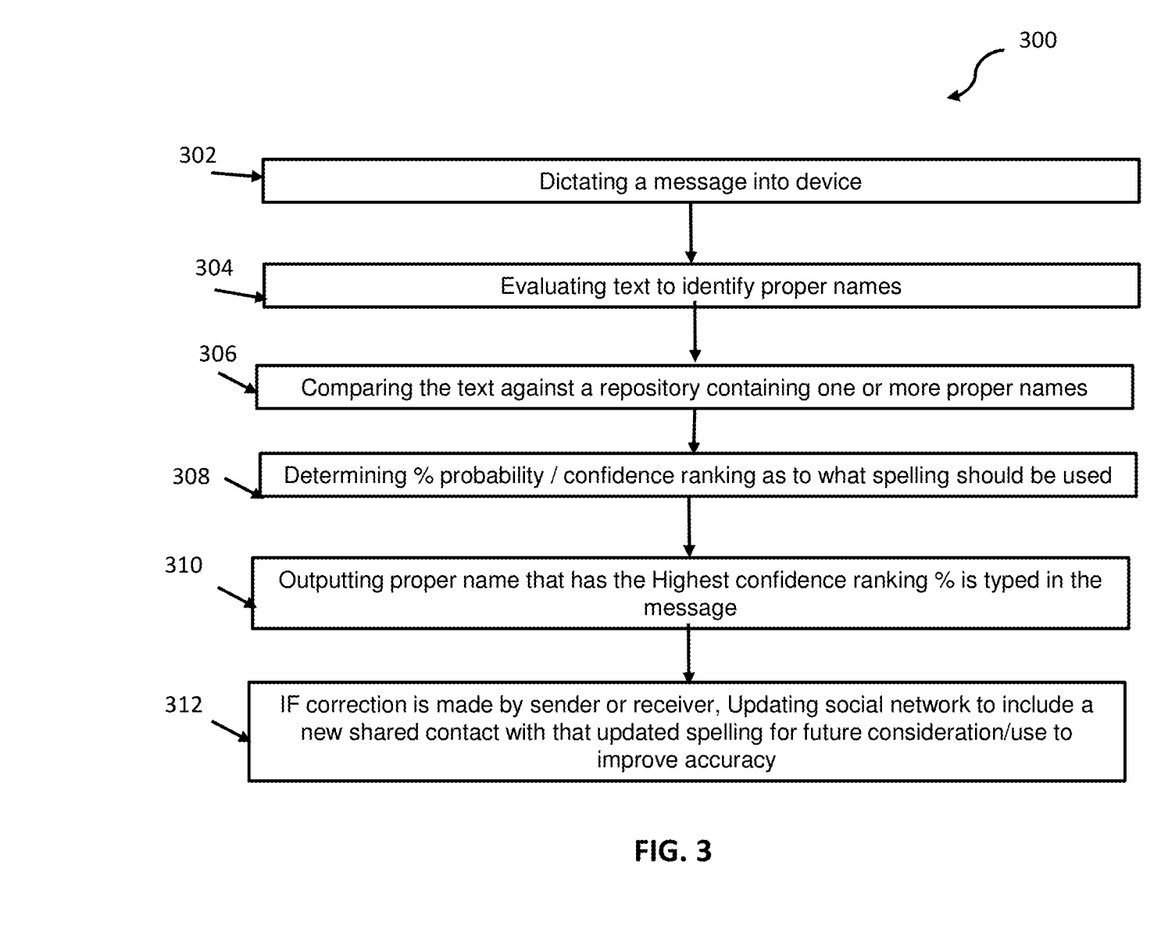
FIG. 3 depicts a flow diagram of a method for providing context aware proper name spelling on a mobile device in accordance with an exemplary embodiment.

FIG. 3 is a flow diagram depicting a method 300 for determining proper name spelling in a text message from a sender to a receiver, in accordance with an exemplary embodiment. Referring now to FIG. 3, according to some embodiments, mobile device 202 (FIGS. 2 and 4) may accept verbal dictation of a message to at least one intended recipient via software 206 (FIG. 2), as shown in block 302. The mobile device 202 of the sender generally manages proper name spellings detected in the text message by evaluating text inputted into the device 202 to identify any proper names including any environmental context information, as shown at block 304, comparing the text against user contacts 204 and a repository ([406] in FIG. 4) containing one or more proper names, as shown in block 306, determining percent probability or confidence rankings related to the accuracy of spelling of the proper name using shared contacts between the sender and receiver, as shown at block 308, and outputting a specific spelling of the proper name based on a highest confidence ranking of the confidence rankings, as shown at block 310. Block 312 depicts iteratively updating the user contacts 204 and repository ([406] in FIG. 4) based on one or more future revisions to a contact listing and applying updates to future outputs of the proper name based on the updated contact listing. That is, if correction at block 312 is made to the outputted specific spelling from block 310 by sender or receiver, the social network is updated to include a new shared contact with that updated/corrected spelling for future consideration and/or use to improve accuracy in other text messages.

Figure 4:
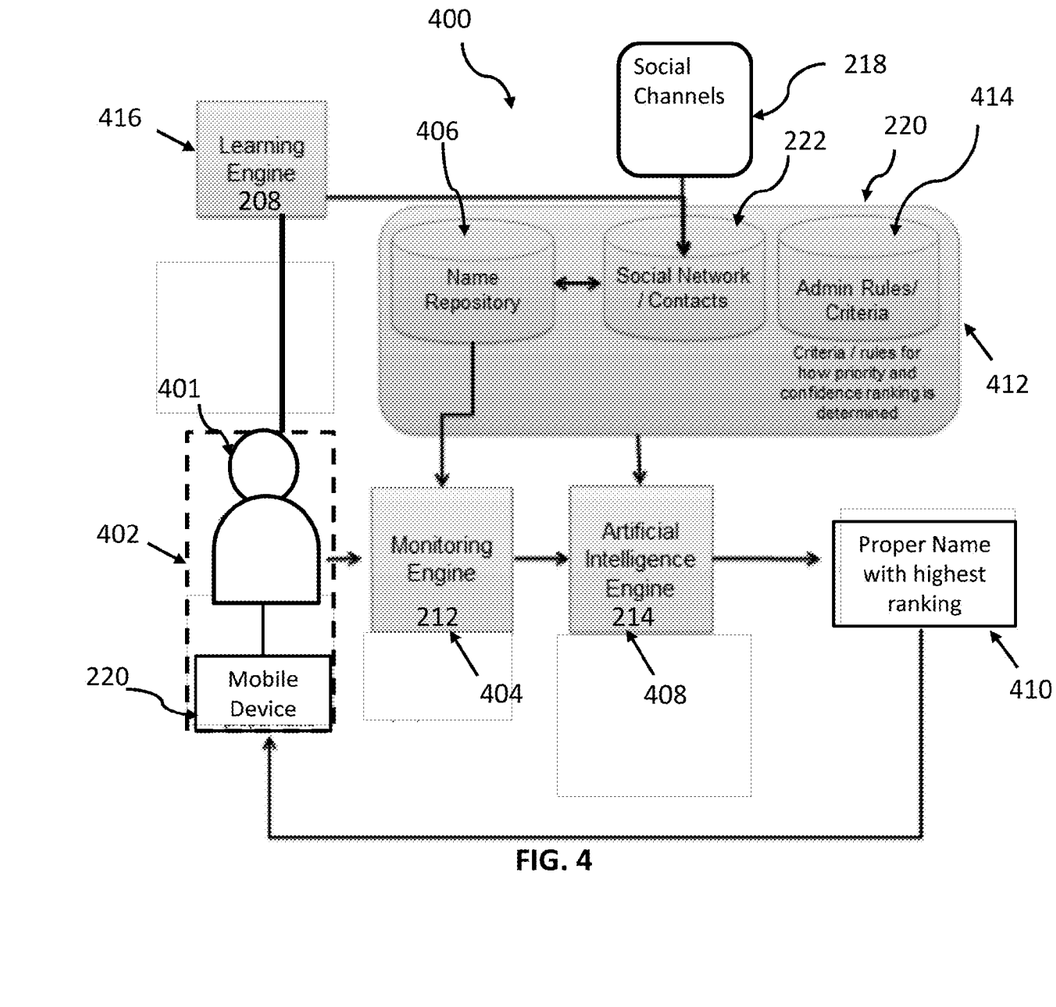
FIG. 4 depicts a workflow diagram of a method for providing context aware proper name spelling and management of recommendations in accordance with an exemplary embodiment.

Considering each block of FIG. 3 in more detail, at block 302 mobile device 202 may receive a user 401 dictated message into the device 202 using a text to type feature. The message may include a proper name of a person, place or business. Mobile device 202 may encounter many recommendations for spelling words including any proper name words that make up the intended text message intender for at least one receiver of the message. FIG. 4 depicts a workflow diagram of a method 400 for providing context aware proper name spelling and management of recommendations for mobile device applications in accordance with an exemplary embodiment.

Referring now to FIG. 4, as shown at block 402 mobile device 202 may listen for a text message dictated by user 401. As shown at decision block 404 the monitoring engine 212 evaluates the text to identify proper names contained therein. The monitoring engine 212 evaluates text to identify proper names by comparing the text against a repository 406, shown as part of the social network interface 220 in FIG. 4. However, this repository 406 may be employed in the mobile device 202 or another file server 210. The repository 406 contains proper names. That is, in an exemplary embodiment the repository 406 includes contacts of at least the sender. In other exemplary embodiments, the repository 406 includes contacts of the sender and the receiver. In exemplary embodiments, the contacts may include shared contacts in a social network 222 or social media 218 used by the sender and the receiver.

For example, at block 404, a user 401 may use his mobile device 202 to text message a coworker that is also part of his social network, e.g., LinkedIn, for example, but not limited thereto. The coworker is the intended receiver and proper names in the text message may be found in the repository 406. Mobile device 202 may receive relevant name recommendation broadcast from a nearby file server after inputting a proper name into the message. The mobile device 202 may further receive other relevant spelling recommendations for the proper name, etc.; until the device has accumulated a large quantity of proper name spelling recommendations that may or may not be applicable to that particular user (i.e., sender) and receiver(s).

As shown at block 408, the artificial intelligence engine 214 determines percent probability/confidence ranking as to what spelling should be used based on the evaluation of the shared network/contacts 222 of the sender and receiver(s) of the message. That is, a confidence ranking related to the accuracy of spelling of the proper name is determined using shared contacts between the sender and receiver. The determination of the confidence ranking may also include consideration of at least one of a spoken language, a business identification, culture, generation (for the purpose of slang words), and location of at least one of the sender and the receiver to ensure proper spelling of words being used in dialogue between user(s) and their network. Device 202 may make this determination based on the environmental context clues learned from the operational environment and from the past actions of device 202.

At block 410, the proper name that has the highest confidence ranking or highest percent probability is typed in the message for the sender and displayed on the mobile device 202. If the user 401 does not make a correction to the displayed proper name spelling, that specific proper name spelling becomes part of the name repository 406 if the specific outputted highest confidence ranking proper name spelling is not already part of the same, at block 412. Further, the shared contacts between the sender and receiver in the relevant social network servers 218 may be updated via interface 220 based on the accepted specific outputted highest confidence ranking proper name spelling.

In one embodiment, mobile device 202 may access GPS receiver 114 (installed on mobile device 202) to determine that mobile device 202 is simply being used in the United States, rather than in another country, like South America, for example. That is, in one embodiment and in addition to proper/people's name, it is contemplated that the system could be expanded to include the user(s)' spoken languages, business identification, culture, generation (for purpose of slang words) and location to ensure proper spelling of words being used in dialogue between user(s) and their network. For example, "Columbia" is used when conversing with people in South Carolina, and "Colombia" is used when conversing with people in South America, etc.

It is also contemplated that in an exemplary embodiment that an option for a user to hard code spelling through rules could be implemented via an administration rules/criteria database 414 of the social network interface 220. This manual override feature would not replace or undermine the learning capabilities of the learning engine 208 discussed herein below.

According to some embodiments, as shown at block 416 mobile device 202 may optionally ignore the one or more recommendations for proper name spelling. In some aspects, it may not be advantageous for mobile device 202 to accumulate an abundance of unneeded recommendations in the queue of the name repository 406 queue. In some aspects, inapplicable recommendations (that may not pertain to appropriate proper name spellings) may be annoying or confusing for a device user receiving the recommendations and/or may be inconvenient to manage. By examining the user's history with respect to a particular social media app, for example, the recommendation status may provide valuable insight for determining a best course of action for any one app recommending. Accordingly, as shown at block 416, mobile device 202 may employ the learning engine 208 to queue the proper name spellings based on whether device 202 has previously encountered the recommendation, and how mobile device 202 has treated previous similar recommendations.

According to some embodiments, as shown at block 416, when a proper name with a highest confidence ranking is outputted at block 410, the user 401 may accept the output or correct the output. If the user 401 corrects the output at block 416, the learning engine 208 allows an update that can be made to the name repository 406 as well as to the social network 218 via interface 220 at block 412 to include a new shared contact with that corrected spelling. The corrected spelling of the proper name can be used for future correspondence and use to improve accuracy in subsequent use the corrected proper name. That is, the repository 406, social network/contacts/data 222 and administration rules/criteria 414 at block 412 may be iteratively updated based on one or more future revisions to a contact listing and applying updates to future outputs of the proper name based on the updated contact listing using the learning engine 208. These corrections may also be reflected in the social network servers 218 via interface 220.

Considering now the method 400 for determining an installation recommendation of a highest ranking confidence proper name status as depicted in FIG. 4, mobile device 202 may determine an installation recommendation status for the broadcasted proper name spelling recommendation. An installation recommendation status may include information indicative of whether an installation recommendation has been received by mobile device 202 at a previous time, and whether mobile device 202 had previously installed and/or deleted the recommendation. In some aspects, as shown at block 416 mobile device 202 may determine whether mobile device 202 has previously received and/or installed the recommendation. In some embodiments, mobile device 202 may access memory (e.g., memory 102) to determine whether mobile device 202 has previously received the recommendation. In other aspects, mobile device 202 may send a request to a remote file server (e.g., file server 210) that may store information indicative of previous recommendations received.

In some aspects, mobile device 202 may have never received that particular recommendation. At block 416, mobile device 202 may add the recommendation to an application contacts queue on the device.

The learning engine 208 may further use an environmental context to include information indicative of a particular reason that mobile device 202 is queuing the proper name recommendation (e.g., saving the proper name recommendation on mobile device 202 in a particular order respective to other saved proper name recommendations). An application proper name queue may include an ordered list of a plurality of recommendations for an intended proper name spelling.

In some aspects, an environmental context can be indicative of how or why an extended recommendation for proper name spelling is queued on the device. According to some embodiments, mobile device 202 may evaluate environmental context information (e.g., date, time, spoken language, a business identification, culture, generation, and location of at least one of the sender and the receiver, etc.) while evaluating environmental context. Although proper name spelling queue on the display 117 shows only a few recommendations having environmental context, the proper name spelling is exemplary only. It is contemplated that the proper name spelling may include any number of contexts derivable from the environmental context information available to mobile device 202.

Referring again to FIG. 4, at block 402, mobile device 202 may determine that the recommendation has not been previously received. In some aspects, mobile device 202 may add the recommendation to the user contacts 204 and/or repository 406. If mobile device 202 determines that the recommendation was previously received, the mobile device 202 may then determine whether the recommendation was previously received and installed, and then deleted from mobile device 202.

For example, if a user is recommended a proper name of "Colombia" while attending a conference in South America, a user may accept that proper name for use at the conference, and then later delete that proper name spelling from her mobile device at the end of the conference. In this example, as shown at block 416, the mobile device 202 may evaluate environmental context information (e.g., time information, date information, spoken language, business identification, culture, generation, and location of at least one of the sender using GPS information and the receiver, etc.) in connection with previous recommendation installations (installation history), and determine that the user usually deletes this proper name spelling after leaving the out of country conference. Accordingly, as shown at block 416, mobile device 202 may ignore the recommendation, remove the recommendation from proper name spelling queue, or add the recommendation to repository 406. In some aspects, mobile device 202 may rearrange the recommendation queue by adding the recommendation to the top of the queue (e.g., in first position before the outputted recommendation from block 410).

According to another embodiment, mobile device 202 may rearrange proper name spelling queue by removing the recommendation from proper name spelling queue.

In other aspects, mobile device 202 may request user input and rearrange the proper name spelling queue based on an input received from the user and/or receiver of the massage. For example, mobile device 202 may display a visual prompt on output device 116 requesting user feedback to perhaps hard code spelling rules when that particular user has historically changed the outputted highest confidence ranking proper name spelling.

In other embodiments, mobile device 202 may rearrange proper name spelling queue automatically based on a predetermined list of user preferences using the learning engine 208 at block 416. Mobile device 202 may receive the user input, save each of the predetermined preferences in the predetermined list of preferences, and automatically rearrange probable proper name spellings based on the preferences.

In other aspects, mobile device 202 may be configured to preemptively install a proper name spelling queue based on environmental context information. For example, mobile device 202 may determine, based on environmental context information and the installation history, that a user of mobile device 202 would find it convenient to automatically use a particular proper name spelling with respect to a particular date, time, spoken language, a business identification, culture, generation, and location of at least one of the sender and the receiver, etc. Accordingly, mobile device 202 may automatically install the appropriate intended particular proper name spelling recommendation.

According to other embodiments, mobile device 202 may determine, based on user input, a preferred order for each recommendation in the proper name spelling queue in repository 406. For example, mobile device 202 may be configured to receive tactile input by sliding, with a finger gesture, etc., a particular recommendation up or down a proper name spelling queue.

In yet other exemplary embodiments, mobile device 202 may include a social media module 224 configured to share preferred and/or corrected proper name spelling recommendations with one or more other mobile devices (e.g., mobile device 216) (See FIG. 2).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining proper name spelling in a text message from a sender to a receiver, the method comprising:
    receiving, by a computer system, verbal dictation of a message that is to be transmitted as a text message from a sender to a receiver;
    evaluating, by the computer system, text of the text message from the sender to the receiver to identify a proper name by at least comparing, by the computer system, the text against a repository containing one or more proper names, wherein the repository includes social network contacts that are shared between the sender and receiver, wherein the social network contacts are obtained by the computer system from a social network server via a social network interface of the computer system;
    determining, by the computer system, a confidence ranking related to an accuracy of spelling of the proper name based on an evaluation of the social network contacts that are shared between the sender and the receiver;
    outputting, by the computer system, a specific spelling of the proper name based on a highest confidence ranking of the confidence ranking;
    executing a learning engine, by the computer system, that queues the outputted proper name spelling based on whether the computer system has previously encountered the outputted proper name spelling; and
    in response to receiving a manual override from the sender that corrects the outputted spelling of the proper name, updating, via the social network interface, the social network contacts stored on the social network server to include a new shared contact with the corrected spelling of the proper name.

2. The method of claim 1, further comprising:
    iteratively updating the repository based on one or more future corrections to outputted proper names and applying updates to future outputs of the proper name based on the updated repository.

3. The method of claim 1, wherein determining a confidence ranking includes considering a spoken language, business identification, culture, generation, and location of at least one of the sender and the receiver.

4. The method of claim 2, further comprising:
    providing a manual override allowing an option for the sender or receiver to hard code spelling using rules.

5. The method of claim 1, wherein the proper names includes names of persons, places and businesses.

6. An information processing system for selecting features from a feature space,
    the information processing system comprising:
    a memory;
    a processing device communicatively coupled to the memory; and
    a name selection module communicatively coupled to the memory and the processing device, wherein the name selection module is configured to perform the steps of a method comprising:
        receiving, by the naming module, verbal dictation of a message that is to be transmitted as a text message from a sender to a receiver;
        evaluating, by the naming module, text of the text message from the sender to the receiver to identify a proper name by at least comparing, by the naming module, the text against a repository containing one or more proper names, wherein the repository includes social network contacts that are shared between the sender and receiver, wherein the social network contacts are obtained by the naming module from a social network server via a social network interface;
        determining, by the naming module, a confidence ranking related to an accuracy of spelling of the proper name based on an evaluation of the social network contacts that are shared between the sender and the receiver;
        outputting, by the naming module, a specific spelling of the proper name based on a highest confidence ranking of the confidence ranking;
        executing a learning engine, by the computer system, that queues the outputted proper name spelling based on whether the computer system has previously encountered the outputted proper name spelling; and
        in response to receiving a manual override from the sender that corrects the outputted spelling of the proper name, updating, via the social network interface, the social network contacts stored on the social network server to include a new shared contact with the corrected spelling of the proper name.

7. The information processing system of claim 6, wherein the method further comprises:
    iteratively updating the repository based on one or more future corrections to a outputted proper names and applying updates to future outputs of the proper name based on the updated repository.

8. The information processing system of claim 6, wherein the determining a confidence ranking includes considering a spoken language, a business identification, culture, generation, and location of at least one of the sender and the receiver.

9. The information processing system of claim 7, wherein the method further comprises:
provide a manual override allowing an option for the sender or receiver to hard code spelling using rules.

10. A non-transitory computer-readable storage medium storing instructions executable to perform a method for determining proper name spelling in a text message from a sender to a receiver, the method comprising:
receiving, by a computer system, verbal dictation of a message that is to be transmitted as a text message from a sender to a receiver;
evaluating, by the computer system, text of the text message from the sender to the receiver to identify a proper name by at least comparing, by the computer system, the text against a repository containing one or more proper names, wherein the repository includes social network contacts that are shared between the sender and receiver, wherein the social network contacts are obtained by the computer system from a social network server via a social network interface of the computer system;
determining, by the computer system, a confidence ranking related to an accuracy of spelling of the proper name based on an evaluation of the social network contacts that are shared between the sender and the receiver;
outputting, by the computer system, a specific spelling of the proper name based on a highest confidence ranking of the confidence ranking;
executing a learning engine, by the computer system, that queues the outputted proper name spelling based on whether the computer system has previously encountered the outputted proper name spelling; and
in response to receiving a manual override from the sender that corrects the outputted spelling of the proper name, updating, via the social network interface, the social network contacts stored on the social network server to include a new shared contact with the corrected spelling of the proper name.

11. The non-transitory computer-readable storage medium of claim 10, the method further comprising:
iteratively updating the repository based on one or more future corrections to outputted proper names and applying updates to future outputs of the proper name based on the updated repository.

12. The non-transitory computer-readable storage medium of claim 10, wherein determining a confidence ranking includes considering at least one of a spoken language, business identification, culture, generation, and location of at least one of the sender and the receiver.

13. The non-transitory computer-readable storage medium of claim 10, wherein the determination of a confidence ranking includes considering of a spoken language, culture, generation, and location of at least one of the sender and the receiver.

* * * * *